(12) United States Patent
Dristy

(10) Patent No.: US 10,756,361 B2
(45) Date of Patent: Aug. 25, 2020

(54) INTERMEDIATE MODULE FOR ELECTROCHEMICAL CELL STACK

(71) Applicant: SKYRE, INC., East Hartford, CT (US)

(72) Inventor: Mark E. Dristy, Aiken, SC (US)

(73) Assignee: SKYRE, INC., East Hartford, CT (US)

( * ) Notice: Subject to any disclaimer, the term of this patent is extended or adjusted under 35 U.S.C. 154(b) by 566 days.

(21) Appl. No.: 14/978,439

(22) Filed: Dec. 22, 2015

(65) Prior Publication Data

US 2016/0190631 A1     Jun. 30, 2016

Related U.S. Application Data

(60) Provisional application No. 62/097,481, filed on Dec. 29, 2014.

(51) Int. Cl.

| | |
|---|---|
| *H01M 8/04* | (2016.01) |
| *H01M 8/248* | (2016.01) |
| *H01M 8/2483* | (2016.01) |
| *C25B 9/18* | (2006.01) |
| *H01M 8/04089* | (2016.01) |
| *H01M 8/0656* | (2016.01) |

(Continued)

(52) U.S. Cl.
CPC .......... *H01M 8/04089* (2013.01); *C25B 9/18* (2013.01); *H01M 8/04* (2013.01); *H01M 8/04223* (2013.01); *H01M 8/0656* (2013.01); *H01M 8/248* (2013.01); *H01M 8/2483* (2016.02); *H01M 2008/1095* (2013.01)

(58) Field of Classification Search
None
See application file for complete search history.

(56) References Cited

U.S. PATENT DOCUMENTS

| | | |
|---|---|---|
| 4,317,864 A | 3/1982 | Strasser |
| 5,510,203 A | 4/1996 | Hamada et al. |

(Continued)

FOREIGN PATENT DOCUMENTS

| | | |
|---|---|---|
| JP | H0562702 A | 3/1993 |
| WO | 2012078786 A2 | 6/2012 |

OTHER PUBLICATIONS

International Search Report and the Written Opinion for International Application No. PCT/US2015/067570 dated Mar. 13, 2016, dated Apr. 1, 2016; 14 pages.

*Primary Examiner* — Jonathan Crepeau
(74) *Attorney, Agent, or Firm* — Cantor Colburn LLP

(57) ABSTRACT

An electrochemical cell stack is disclosed having a plurality of stacked planar electrochemical cell modules, a first end plate at a first end of the stacked planar modules, and a second end plate at a second end of the stacked planar modules. Also included in the stack is an intermediate planar module disposed between adjacent electrochemical cells in the stack. In some aspects, the intermediate module includes a cavity disposed internally within the intermediate module that is in fluid communication with a fluid source at a pressure higher than the operating pressure of the electrochemical cell stack on either side of the intermediate module. In some aspects, the electrochemical cell stack includes an electrically conductive process liquid in fluid communication with a plurality of electrochemical cells in the stack, and the intermediate planar module includes an electrically non-conductive channel in fluid communication with the electrically conductive process liquid.

20 Claims, 4 Drawing Sheets

(51) Int. Cl.
 *H01M 8/04223* (2016.01)
 *H01M 8/1018* (2016.01)

(56) References Cited

U.S. PATENT DOCUMENTS

| | | | |
|---|---|---|---|
| 6,669,826 B1 * | 12/2003 | Milgate, Jr. | C25B 9/18 |
| | | | 204/254 |
| 2006/0093890 A1 | 5/2006 | Steinbroner | |
| 2008/0090140 A1 | 4/2008 | Dalton et al. | |
| 2009/0246585 A1 | 10/2009 | Kariya et al. | |
| 2011/0117419 A1 | 5/2011 | Lee et al. | |
| 2012/0009499 A1 | 1/2012 | Hansen et al. | |
| 2012/0202127 A1 | 8/2012 | Friesen et al. | |
| 2013/0130148 A1 | 5/2013 | Haltiner, Jr. et al. | |
| 2015/0072258 A1 * | 3/2015 | Naito | H01M 8/0267 |
| | | | 429/434 |

* cited by examiner

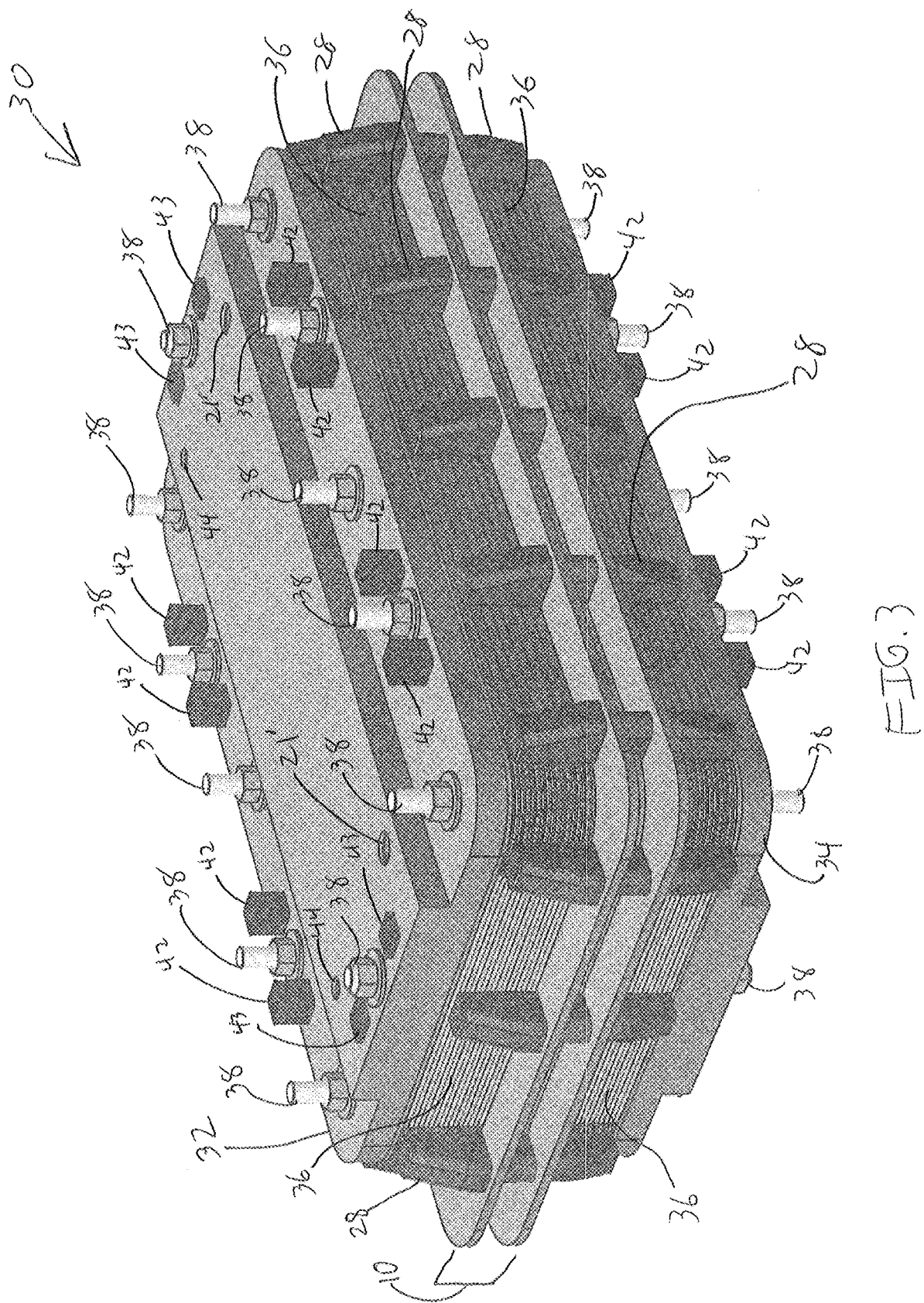

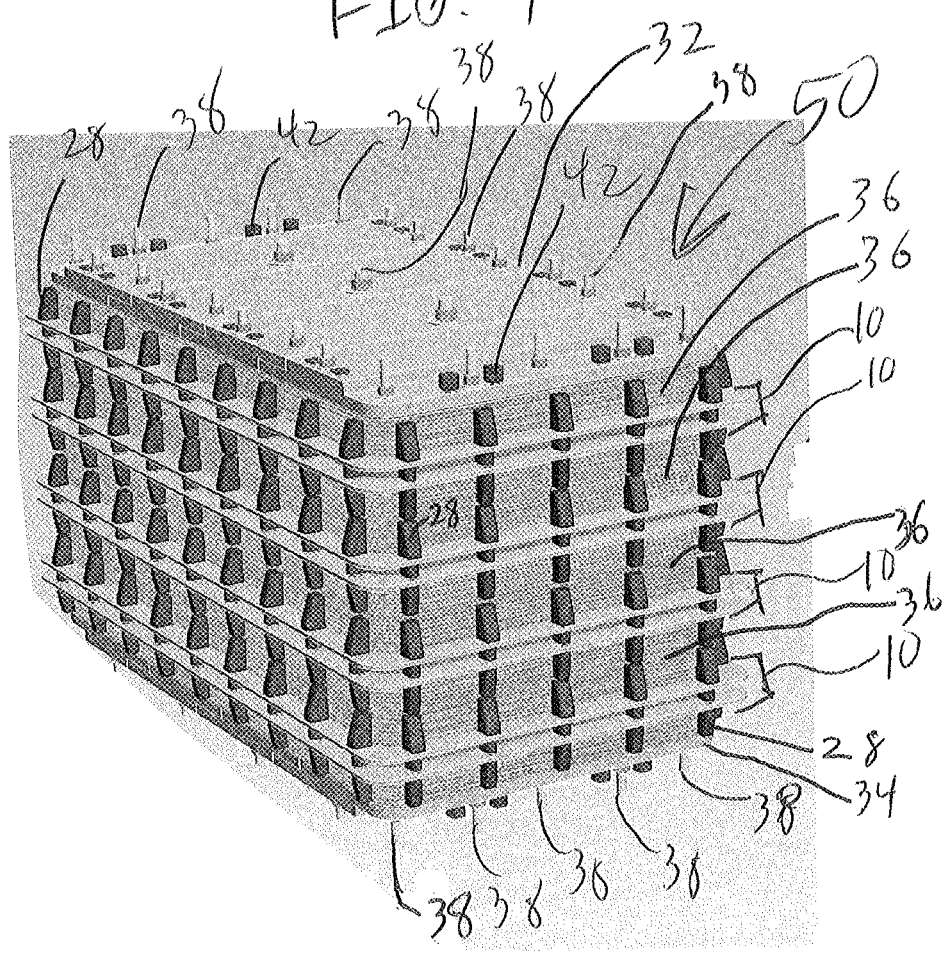

INTERMEDIATE MODULE FOR ELECTROCHEMICAL CELL STACK

BACKGROUND OF THE INVENTION

The subject matter disclosed herein relates to electrochemical cells, and in particular an intermediate module for an electrochemical cell stack.

Electrochemical cells are commonly used in a stack configuration for a variety of applications such as electricity generation from hydrogen or hydrocarbon fuel, production and compression of hydrogen, production and compression of oxygen or oxygen-enriched air, or production nitrogen-enriched air. Although stack configurations can vary, a common design involves a series of planar membrane electrode assemblies (MEA), each disposed in a stackable frame, separated by electrically conductive separator plates, also referred to as bi-polar plates. The bi-polar plates serve to connect the stacked MEA's in series, and to separate the fluid on the anode side of each MEA from the fluid on the cathode side of the adjacent MEA in the stack. Fluid flow channels to deliver and receive fluid flow from cells are commonly incorporated in the frames of the stacked components. The stack typically has an end plate at each end of the stack. The stacked components are assembled under a compressive load from bolts extending between the end plates through the stack. However, it can be difficult to maintain this compressive load throughout multiple pressure cycles encountered during operation of the electrochemical cell stack or at higher operating pressures (e.g., ≥100 psi). Commonly used responses to these problems include the use of compression springs in with the nut and bolt connections, however, such techniques only reduce and do not eliminate the problem. Moreover, high endplate loads required to ensure positive cell stack sealing at operating pressures can also induce creep in the cell membrane and other plastic components subjected to the compressive load. In addition, electrochemical cell stacks can be subject to experience reduced electrical conductivity at higher internal pressures due to cell component off-loading caused by the pressure differences between the anode and cathode sides of the stack.

In some applications for electrochemical cells, a process fluid having electrical conductivity is in contact with one or more portions of the MEA's in the stack. For example, some PEM electrochemical cell stacks use water containing an electrolyte such as hydrogen chloride in contact with both sides of the MEA units in the stack, with fluid connections in the stackable frame between adjacent cells. However, differences in electronegative potential between different portions of the stack in contact with the process liquid can lead to shunt currents forming in the process liquid. Such shunt currents can reduce efficiency of the electrochemical cell stack, cause corrosion, and lead to unwanted gas forming from electrochemical reactions in the process liquid (e.g., the generation of unwanted $H_2$, $O_2$, and $Cl_2$ gas in an HCl solution process fluid).

In addition to managing axial loading of an electrochemical cell stack as described above (i.e., loadings along an axis of the stack transverse to the plane of the stacked planar modules), lateral loadings can also be an issue, particularly in the case of higher operating pressures such as encountered with applications such as with the use of electrochemical cell stacks for hydrogen compression. Outwardly-directed lateral stress during operation of the stack can cause deformation of key components, fluid leaks, and electrical anomalies.

BRIEF DESCRIPTION OF THE INVENTION

According to some aspects of the invention, an electrochemical cell stack comprises a plurality of stacked planar modules comprising electrochemical cells, a first end plate at a first end of the stacked planar modules, and a second end plate at a second end of the stacked planar modules. Also included in the stack is an intermediate planar module disposed between adjacent electrochemical cells in the stack.

In some aspects of the invention, the intermediate planar module comprises a cavity disposed internally within the intermediate module that is in fluid communication with a fluid source at a pressure higher than the operating pressure of the electrochemical cell stack on either side of the intermediate module.

In some aspects of the invention where the electrochemical cell stack comprises an electrically conductive process liquid in fluid communication with a plurality of electrochemical cells in the stack, the intermediate planar module comprises an electrically non-conductive channel in fluid communication with the electrically conductive process liquid.

In some aspects of the invention, an electrochemical cell stack comprises a plurality of stacked planar modules comprising electrochemical cells, the stacked planar modules having an external perimeter surface. The stack also includes at least one plate that extends in a direction parallel with the plane of the stacked planar modules beyond the external perimeter surface of the stacked planar modules. A plurality of anchors are disposed along a perimeter portion of the at least one plate, with the anchors extending from plate in a direction perpendicular to the plane of the stacked planar modules. The anchors include a surface portion that provides structural support along the external perimeter surface of the stacked planar modules against stress in a direction parallel to the plane of the stacked planar module.

BRIEF DESCRIPTION OF THE DRAWINGS

The subject matter, which is regarded as the invention, is particularly pointed out and distinctly claimed in the claims at the conclusion of the specification. The foregoing and other features, and advantages of the invention are apparent from the following detailed description taken in conjunction with the accompanying drawings in which:

FIG. 3 is a schematic depiction of an electrochemical cell stack including an intermediate module in accordance with an exemplary embodiment of the invention; and FIG. 4 is a schematic depiction of an electrochemical cell stack including multiple intermediate modules in accordance with an exemplary embodiment of the invention.

The detailed description explains embodiments of the invention, together with advantages and features, by way of example with reference to the drawings.

DETAILED DESCRIPTION OF THE INVENTION

Figure 1:
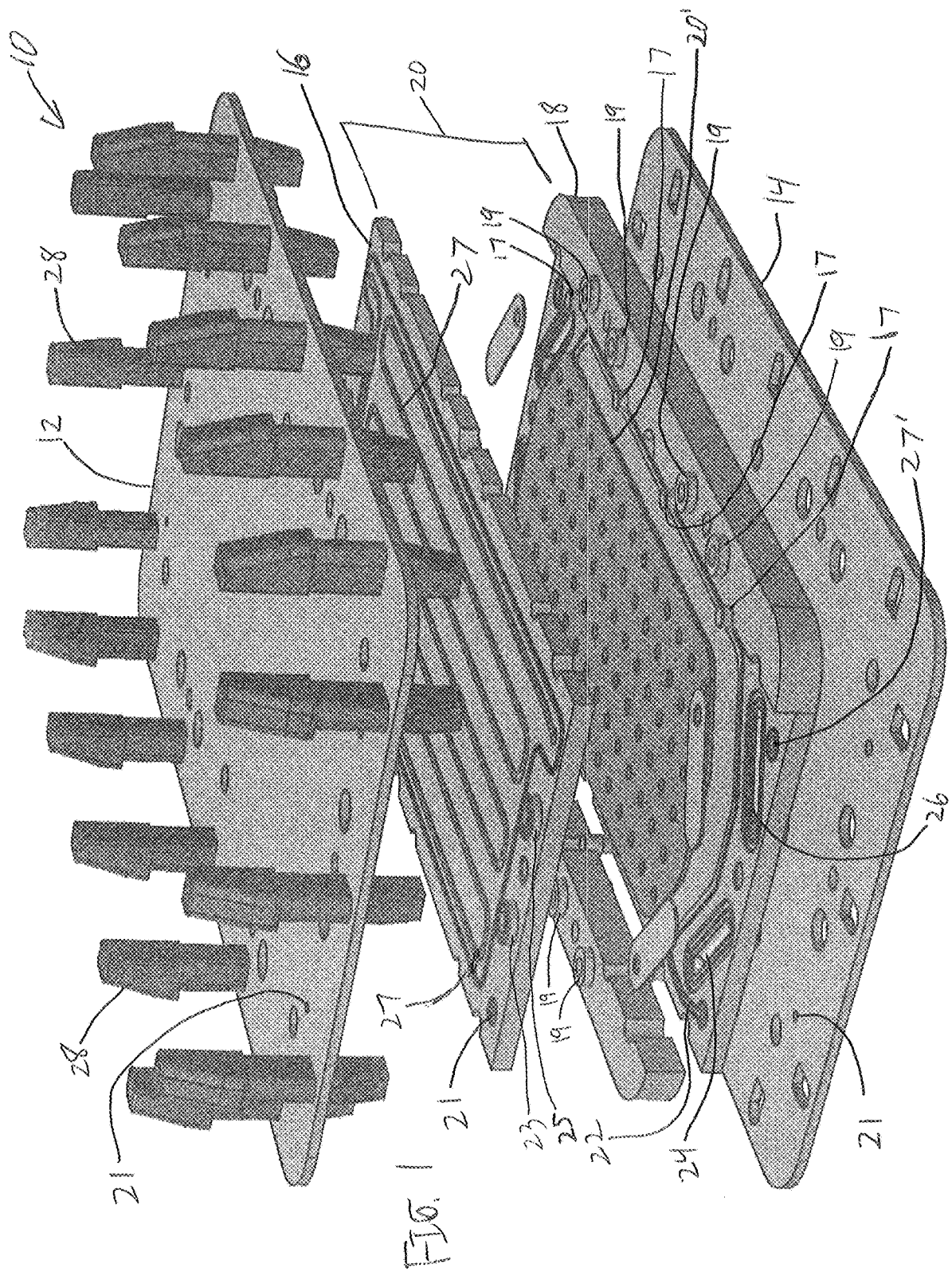
FIG. 1 is a schematic depiction of an exploded view of an intermediate module in accordance with an exemplary embodiment of the invention.

Referring now to FIG. 1, an exemplary intermediate module 10 is shown. Intermediate module 10 includes intermediate module outer endplates 12, 14, with intermediate module inner plates 16, 18 disposed between the intermediate module end plates 12, 14. Flow-through ports 19 in the plates 12, 14, 16, 18 provide passages for transport of electrochemical process fluids between electrochemical cells on either side of the intermediate module 10. Electrical conductor inserts 17 provide electrical connectivity through the intermediate module 10 between adjacent electrochemical cells in the stack.

In some embodiments, the intermediate module inner plates 16, 18 are configured so that a cavity 20 exists between them when they are assembled together. The cavity 20 maintains fluid communication with a fluid source through pressure ports 21 and pressure channels 22. During operation, fluid from the pressure source pressurizes the cavity 20 at a pressure higher than the operating pressure of the stack on either side of intermediate module. The planar surfaces of the intermediate module inner plates 16 and 18 that form the cavity 20 are sealed along their perimeter but include thin-wall central portions, and the intermediate module 10 functions as a pressure pad where stress from pressure in the cavity 20 can transfer through these thin-wall portions to adjacent components in the stack during operation. In some embodiments, an optional elastomeric pad such as elastomeric pad 20' can be disposed in the cavity 20 to provide additional pressure pad characteristics and capabilities to the stack.

In some embodiments, the intermediate module 10 includes one or more electrically non-conductive channels such as non-conductive channels 24 and 26 shown in intermediate module inner plate 18. During operation, the non-conductive channels 24 and 26 are in fluid communication through ports 23 and 25 with a process liquid (e.g., water containing an electrolyte) that is in fluid communication with electrochemical cells on each side of the intermediate module 10. The intermediate module 10 can optionally include additional features such as channel 27 for flow of cooling liquid introduced through cooling liquid port 27'.

Figure 2:
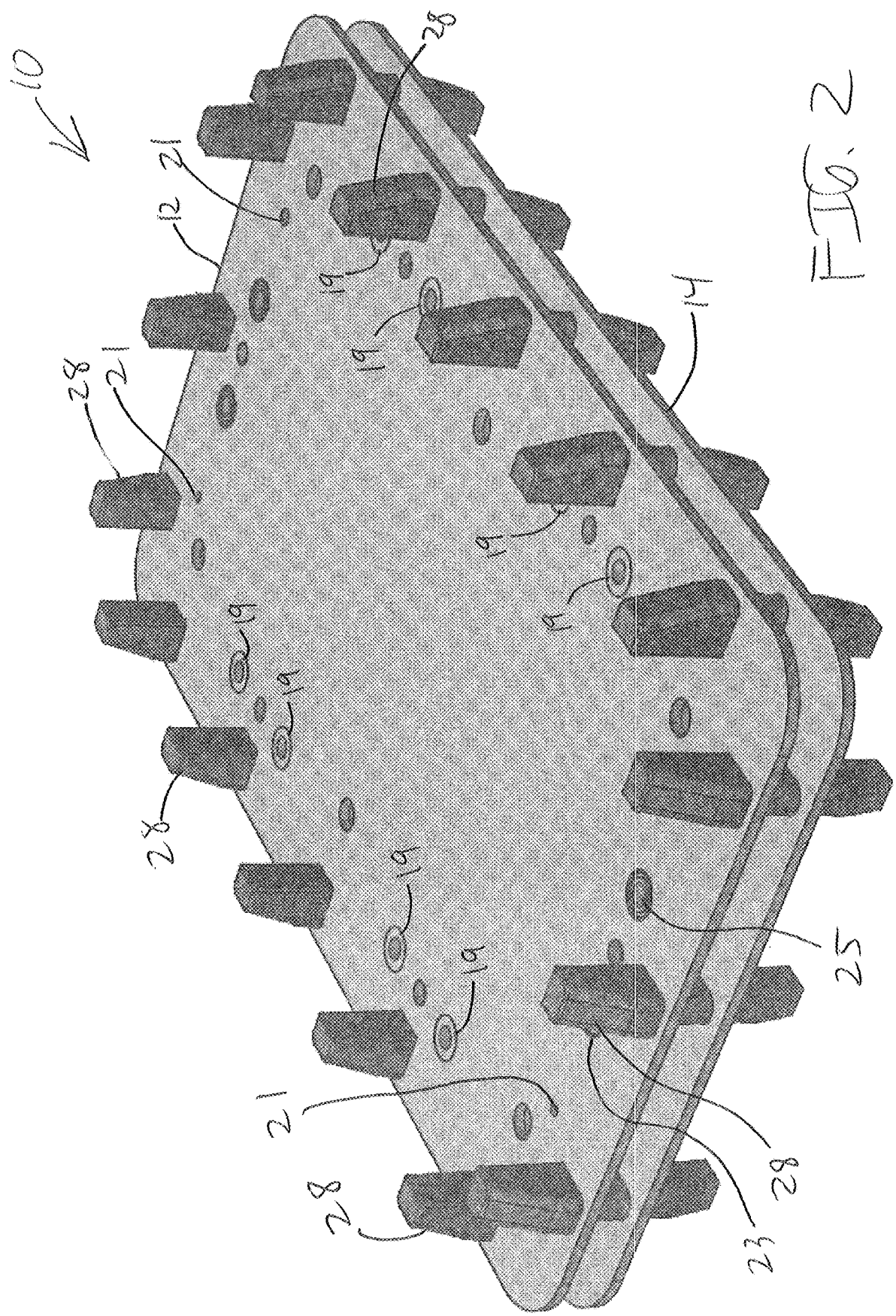
FIG. 2 is a schematic depiction of an assembled view of an intermediate module in accordance with an exemplary embodiment of the invention.

In some embodiments, the intermediate module 10 can include optional anchors 28 disposed along a perimeter portion of the intermediate module end plates 24, 26. For ease of illustration, the anchors 28 are depicted in FIG. 1 only on the intermediate module end plate 24. FIG. 2 depicts the intermediate module 10 from FIG. 1 in an assembled state. As shown in FIG. 2, the anchors 28 extend between and past the intermediate module end plates 24 and 26 in a direction perpendicular to the plane of the planar modules in the electrochemical cell stack.

Turning now to FIG. 3, the intermediate module 10 is shown assembled into an electrochemical cell stack 30. Individual electrochemical cells can be arranged as modules in a stack, separated by interconnects that can provide flow field structures as well as electrical connection between the cells to provide electrical current flow in the stack. Typically, the cells in a stack are connected in series electrically, with fluid flow distributed into or collected from the stack by header passages that are in fluid communication with the stack inlets and outlets. It should be appreciated that each of the electrochemical cells or stacks can include further components as is known in the art. These additional components can include, for example, gas diffusion layers, current collectors and the like.

As shown in FIG. 3, electrochemical cell stack 30 includes end plates 32, 34 and a number of stacked planar modules 36 comprising electrochemical cells and associated components (e.g., framed membrane electrode assemblies, bipolar or separator plates, gaskets, flow fields, current collectors, etc.) between the endplates. Tie rods 38 extend between the end plates 32, 34, and are used to fasten the end plates and interposed stacked planar modules together under a compressive load to form the electrochemical cell stack 30. Fluid communication ports 42 and 43 deliver cathode feed and/or anode feed to the stack, and receive cathode exhaust and/or anode exhaust from the stack, as well as provide fluid communication with process liquids used to hydrate polymer electrolyte membranes or provide electrolysis feedstock (e.g., water or water with an electrolyte such as HCl). Pressurized fluid port 44 receives pressurized fluid from a fluid source (not shown) for delivery to the intermediate module's cavity 20. Coolant fluid ports 21' receive a flow of cooling liquid for delivery to the intermediate module's cooling ports 21 and cooling flow channels 22. As shown in FIG. 3, a flat surface on the anchors 28 engages against an external perimeter surface of the stacked planar modules 36 to provide support against outward lateral stress generated during operation of the stack.

Although the intermediate module 10 is depicted in FIG. 1 with a cavity 20 in fluid communication with both a pressurized fluid source and electrically non-conductive channels 24, 26 for an electrically conductive process fluid, intermediate modules within the scope of the invention can also be configured with only one or the other of these two features. As. For embodiments that include a cavity such as cavity 20, the cavity is pressurized with fluid from a fluid source during operation of the electrochemical cell stack. The cavity pressure should be higher than the stack operating pressure on either side of the intermediate module, and stress from the pressurized cavity can transfer through thin-wall portions of the intermediate module inner plates 16, 18 to adjacent components in the stack to promote beneficial cell-to-cell contact pressures (and accompanying low contact electrical resistance), as well as stack seal integrity. In some embodiments, the pressure in cavity 20 is from 5 to 150 psi higher than the stack operating pressure on either side of the intermediate module.

By offering the ability to selectively apply stress from pressure in the cavity 20 during operation of the stack, the need for high compressive loads applied during assembly from the tie rods 38 can be reduced. In some embodiments, the fluid source for pressurizing cavity 20 can be an external source of compressed gas. In some embodiments, the fluid source can be compressed hydrogen produced by the electrochemical cell stack. In some embodiments where the fluid source can be compressed hydrogen produced by the electrochemical cell stack, an external source of pressurized fluid can be used during startup of the stack until it is producing sufficient pressurized hydrogen to pressurize the cavity 20. An example of an external source of pressurized gas can be stored compressed hydrogen produced by a previous operation cycle of the electrochemical cell stack, a stored inert pressurized gas such as nitrogen, or a pressurized liquid such as water.

For embodiments that include electrically non-conductive channels such as channels 24, 26 in an intermediate module, parasitic shunt currents can be managed by routing fluid communication paths for process liquids in the stack through the non-conductive channels 24, 26. Parasitic shunt currents can form in an electrochemical cell stack from electrically conductive process liquids in fluid communication with different cells at different voltage potentials. As used herein, electrically conductive process fluid or liquid means any fluid or liquid having an electrical conductivity of at least 0.005 Siemens/m. Aqueous process liquids are often used in proton electrolyte membrane (PEM) cell stacks for purposes such as hydration of ionic polymer membranes or providing a source of oxygen and hydrogen from electrolysis of water, and the process liquid is typically in fluid communication with multiple cells in the stack. In some stack designs, a process liquid with an electrolyte such as an aqueous acid (e.g., HCl) is used. In such cases, an electrically conductive pathway through the conductive liquid between cells or cell electrodes having a different operating voltage can lead to a parasitic electric current in the process liquid. The non-conductive channels such as channels 24, 26 add additional length to this path, increasing the overall resistance along the path and thereby reducing the amount of unwanted shunt current. Electrically non-conductive pathways can also be used in other stack components such as fluid flow passages in the frames of membrane electrode assemblies. However, the intermediate module can offer longer or more strategically placed pathways, and is not constrained by pathway length or configuration limitations imposed by the design requirements of components such as membrane electrode assemblies.

FIG. 3 above depicts for illustrative purposes an electrochemical cell stack 30 with a single intermediate module 10. However, the invention is not limited to stacks with a single such module, and accordingly FIG. 4 depicts an electrochemical cell stack 50 having four separate intermediate modules 10 disposed therein. The use of multiple intermediate modules allows for management of compressive load from the tie rods and shunt currents in larger stacks where a single intermediate module 10 would not be sufficient. For example, shunt currents can become more problematic in stacks with more cells where the voltage differential across the entire stack is larger than for stacks with fewer cells. With respect to the lateral support provided by the anchors 28, it can be seen in FIG. 4 that the spacing of the intermediate modules and the size (length transverse to the plane of the intermediate modules 10) of the anchors 28 cooperate to provide continuous support along the external perimeter surface of the stacked planar modules 36. It should also be noted that the anchors described herein can be used with any module in an electrochemical cell stack, not just the intermediate modules described herein. For example, the intermediate module end plates 12, 14 for each intermediate module 10 shown in FIG. 4 could instead be special MEA frames or separator plate frames that extend laterally beyond the surface of the other stacked planar modules 36, providing an electrochemical cell stack having anchors 28 without any intermediate modules as described herein.

As mentioned above, the electrochemical cell stacks typically include membrane electrode assembly (MEA) modules comprising a planar MEA in a stackable planar frame. A typical MEA comprises an electrolyte membrane such as a proton electrolyte membrane (PEM) having an anode and a cathode disposed on opposite sides thereof. An anode-side flow field structure and a cathode-side flow field structure are typically disposed on either side of the MEA. These flow field structures are typically disposed distal from the MEA, with the MEA and flow field structures each mounted in a frame assembly (not shown), to provide space for fluid flow in contact with the MEA. Proton exchange membranes can comprise electrolytes that are solids under the operating conditions of the electrochemical cell. Useful materials from which the membranes can be fabricated include proton conducting ionomers and ion exchange resins. Ion-exchange resins useful as proton conducting materials include hydrocarbon- and fluorocarbon-type resins. Fluorocarbon-type resins typically exhibit excellent resistance to oxidation by halogen, strong acids, and bases. One family of fluorocarbon-type resins having sulfonic acid group functionality is NAFION® resins (commercially available from E. I. du Pont de Nemours and Company, Wilmington, Del.).

Anodes and cathodes can be fabricated from catalytic materials suitable for performing the needed electrochemical reaction (e.g., the dissociation of water or hydrogen gas). Suitable catalytic materials include, but are not limited to, platinum, palladium, rhodium, carbon, gold, tantalum, tungsten, ruthenium, iridium, osmium, alloys thereof, and the like, as well as combinations of the foregoing materials. Anodes and cathodes are positioned adjacent to, and preferably in contact with, their respective electrolyte membranes and can have structures comprising discrete catalytic particles adsorbed onto a porous substrate. Adhesion of the catalytic particles onto a substrate may be by any method including, but not limited to, spraying, dipping, painting, imbibing, vapor depositing, combinations of the foregoing methods, and the like. Alternately, the catalytic particles may be deposited directly onto opposing sides of proton exchange membranes or onto support members.

While the invention has been described in detail in connection with only a limited number of embodiments, it should be readily understood that the invention is not limited to such disclosed embodiments. Rather, the invention can be modified to incorporate any number of variations, alterations, substitutions or equivalent arrangements not heretofore described, but which are commensurate with the spirit and scope of the invention. Additionally, while various embodiments of the invention have been described, it is to be understood that aspects of the invention may include only some of the described embodiments. Accordingly, the invention is not to be seen as limited by the foregoing description, but is only limited by the scope of the appended claims.

The invention claimed is:

1. An electrochemical cell stack, comprising:
   a plurality of stacked planar modules comprising electrochemical cells;
   a first end plate at a first end of the stacked planar modules;
   a second end plate at a second end of the stacked planar modules; and
   an intermediate planar module disposed between adjacent electrochemical cells in the stack, wherein the intermediate planar module comprises a first outer endplate, a second endplate, a first inner plate, and a second inner plate;
      wherein the first outer endplate and the second outer endplate extend in a direction parallel with the plane of the stacked planar modules beyond the external perimeter surface of the stacked planar modules forming perimeter portions;
      wherein the first inner plate and the second inner plate are located between the first outer endplate and the second outer endplate and form a cavity there between;
      wherein the cavity is disposed internally within the intermediate module that is in fluid communication with a fluid source at a pressure higher than the operating pressure of the electrochemical cell stack on either side of the intermediate module;
      wherein the first outer endplate, the second endplate, the first inner plate, and the second inner plate each comprise a plurality of flow through ports and a plurality of electrical conductor inserts, wherein the plurality of flow through ports align to provide passage for transport of process fluids between the adjacent electrochemical cells in the stack, and wherein the plurality of electrical conductor inserts provide electrical connectivity between the adjacent electrochemical cells in the stack.

2. The electrochemical cell stack of claim 1, wherein the intermediate planar module comprises an electrically conductive process liquid in fluid communication with a plurality of electrochemical cells in the stack, and the intermediate planar module comprises an electrically non-conductive channel along a fluid communication path for said process liquid between electrochemical cells having a different operating voltage.

3. The electrochemical cell stack of claim 1, wherein the fluid source comprises pressurized hydrogen produced by the electrochemical cell stack.

4. The electrochemical cell stack of claim 3, wherein the fluid source further comprises a stored pressurized fluid for use during startup of the electrochemical cell stack.

5. The electrochemical cell stack of claim 1 wherein the fluid source comprises a stored pressurized fluid.

6. The electrochemical cell stack of claim 1, wherein the intermediate planar module further comprises an elastomer pad disposed in the cavity.

7. An electrochemical cell stack, comprising:
a plurality of stacked planar modules comprising electrochemical cells;
a first end plate at a first end of the stacked planar modules;
a second end plate at a second end of the stacked planar modules; and
an intermediate planar module disposed between adjacent electrochemical cells in the stack,
wherein the electrochemical cell stack comprises an electrically conductive process liquid in fluid communication with a plurality of electrochemical cells in the stack, and the intermediate planar module comprises an electrically non-conductive channel along a fluid communication path for said process liquid between electrochemical cells having a different operating voltage.

8. The electrochemical cell stack of claim 7, wherein the intermediate module is disposed between intermediate module end plates disposed in the stack on each side of the intermediate module.

9. The electrochemical cell stack of claim 1, further comprising a plurality of anchors along the perimeter portions of each end plate and extending between the intermediate module end plates in a direction perpendicular to the plane of the stacked planar modules.

10. The electrochemical cell stack of claim 9, wherein the anchors extend past the end plates, away from the intermediate module along the exterior of the stacked planar modules.

11. The electrochemical cell stack of claim 10, wherein the anchors include a surface portion that provides structural support along an exterior surface of the stack against stress in a direction parallel to the plane of the stacked planar modules.

12. The electrochemical cell stack of claim 11, wherein said surface portion of the anchors is flat.

13. The electrochemical cell stack of claim 12, comprising a plurality of said intermediate modules separated by one or more planar module comprising an electrochemical cell between intermediate modules.

14. A method of operating the electrochemical cell stack of claim 7, comprising pressurizing said cavity with fluid from the fluid source while operating the electrochemical cell stack.

15. The method of claim 14, wherein the electrochemical cell stack is operated at a pressure of at least 100 psi.

16. A method of operating the electrochemical cell stack of claim 14, comprising maintaining the electrically conductive process liquid in fluid communication along a path between two electrochemical cells operating at a different voltage, said path including the intermediate module's electrically non-conductive channel.

17. A electrochemical cell stack, comprising:
a plurality of stacked planar modules comprising electrochemical cells, said stacked planar modules having an external perimeter surface and comprising two end modules located at opposing ends of the stack,
at least one plate disposed in the stack in a location between the two end modules that extends in a direction parallel with the plane of the stacked planar modules beyond the external perimeter surface of the stacked planar modules forming a perimeter portion, and
a plurality of anchors along the perimeter portion of said at least one plate, traversing through openings in the plate and extending from the at least one plate in a direction perpendicular to the plane of the stacked planar modules in the direction of the end modules, the anchors further including a surface portion that is in physical engagement with the external perimeter surface of the stacked planar modules such that the surface portion of the anchors that is in physical engagement provides structural support along the external perimeter surface of the stacked planar modules against stress in a direction parallel to the plane of the stacked planar modules.

18. The electrochemical cell stack of claim 17, wherein said surface portion of the anchors is flat and is in planar engagement with the external perimeter surface of the stacked planar modules.

19. The electrochemical cell stack of claim 17 wherein the electrochemical cells each comprise a proton electrolyte membrane having electrodes disposed on opposite sides of the membrane, wherein the plate comprises flow-through ports that allow flow of an electrochemical process fluid between electrochemical cells located on either side of the plate.

20. A modular electrochemical cell stack comprising a plurality of the electrochemical cells stacks of claim 9; and wherein the modular electrochemical cell stack has a rectangular cross-section.

* * * * *